United States Patent [19]

Dawidzon

[11] Patent Number: 4,887,865

[45] Date of Patent: Dec. 19, 1989

[54] ORTHOPEDIC SEAT AND BACKREST COMBINATION

[76] Inventor: Daniel Dawidzon, 63 Gordon Street, Tel Aviv, Israel

[21] Appl. No.: 268,600

[22] Filed: Nov. 8, 1988

[51] Int. Cl.$^4$ .............................................. B60N 1/02
[52] U.S. Cl. .................................... 297/382; 297/229; 297/230
[58] Field of Search ............... 297/382, 230, 231, 284, 297/229, 219

[56] References Cited

U.S. PATENT DOCUMENTS

| | | | |
|---|---|---|---|
| 2,577,949 | 12/1951 | Barrett | 297/382 |
| 2,827,111 | 3/1958 | Jackson | 297/230 X |
| 3,041,108 | 6/1962 | Cohn | 297/231 |
| 4,275,714 | 1/1981 | Lewis | 128/74 |
| 4,362,334 | 12/1982 | Ross et al. | 297/230 |
| 4,418,958 | 12/1983 | Watkin | 297/457 |
| 4,471,993 | 9/1984 | Watson | 297/230 |
| 4,506,929 | 3/1985 | Josefek | 297/230 |
| 4,526,421 | 7/1985 | Brennan et al. | 297/232 |
| 4,535,495 | 8/1985 | Oldfield | 5/432 |
| 4,541,670 | 9/1985 | Morgenstern et al. | 297/284 |
| 4,555,139 | 3/1983 | Leib | 297/460 |
| 4,556,254 | 12/1985 | Roberts | 297/460 |
| 4,597,386 | 7/1986 | Goldstein | 128/78 |
| 4,601,514 | 7/1986 | Meiller | 297/284 |
| 4,634,178 | 1/1987 | Carney | 297/284 |
| 4,660,887 | 4/1987 | Fleming et al. | 297/445 |
| 4,669,779 | 1/1987 | Kaganas et al. | 297/229 |
| 4,696,516 | 9/1987 | Yeum . | |

Primary Examiner—James T. McCall
Attorney, Agent, or Firm—Helfgott & Karas

[57] ABSTRACT

A seat and backrest combination device formed of contoured, rigid panels which are retained within a slipcover formed of a specially shaped stretchable cloth material. The slipcover is shaped in a "saddlebag" design, having a pair of pockets each of which has a front and rear face, the front faces of the two pockets being joined by a single strip extending for substantially the entire width of the slipcover. The slipcover thus provides a flexible member which allows for interplay between the seat panel rear edge and the back panel lower edge. By appropriate adjustment, the user is provided with a maximum degree of seating comfort, while the benefits of the orthopedic design are not sacrificed. For example, the back panel lower edge may be placed upon or behind the seat panel rear edge, and this is made possible by the stretchable fabric material used to construct the slipcover.

10 Claims, 4 Drawing Sheets

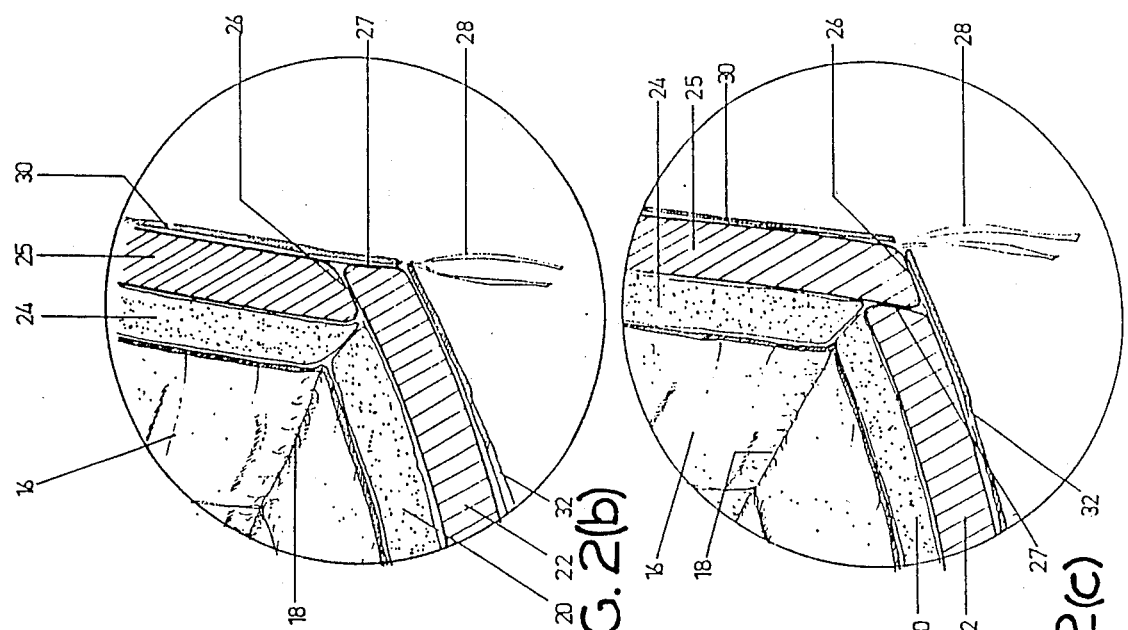
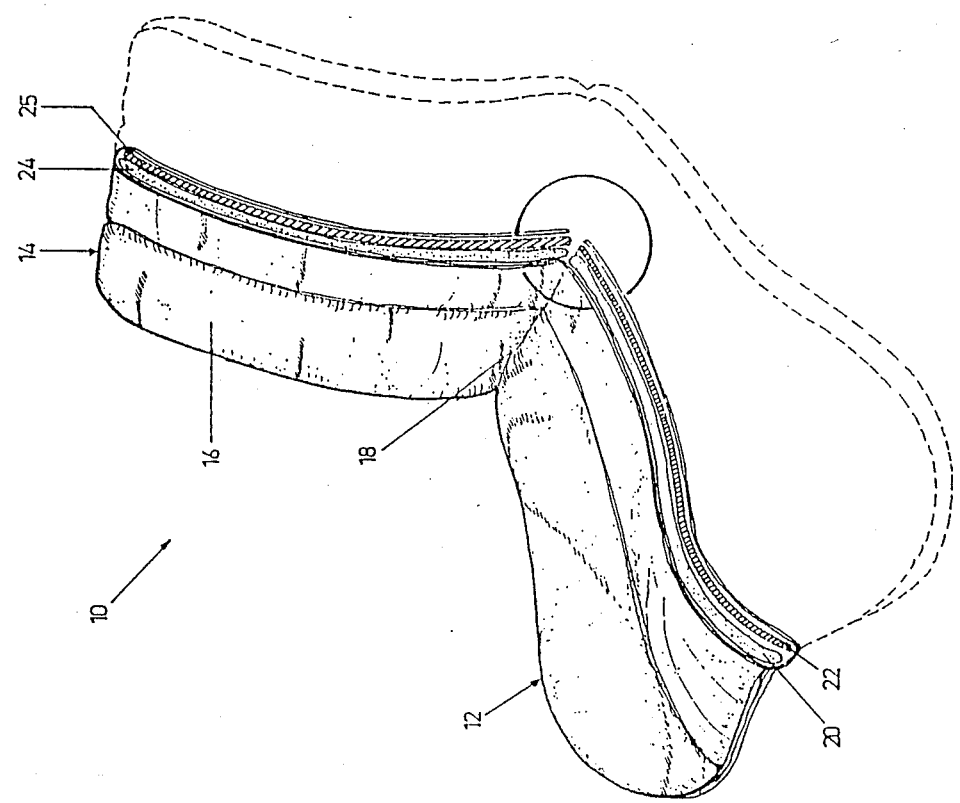

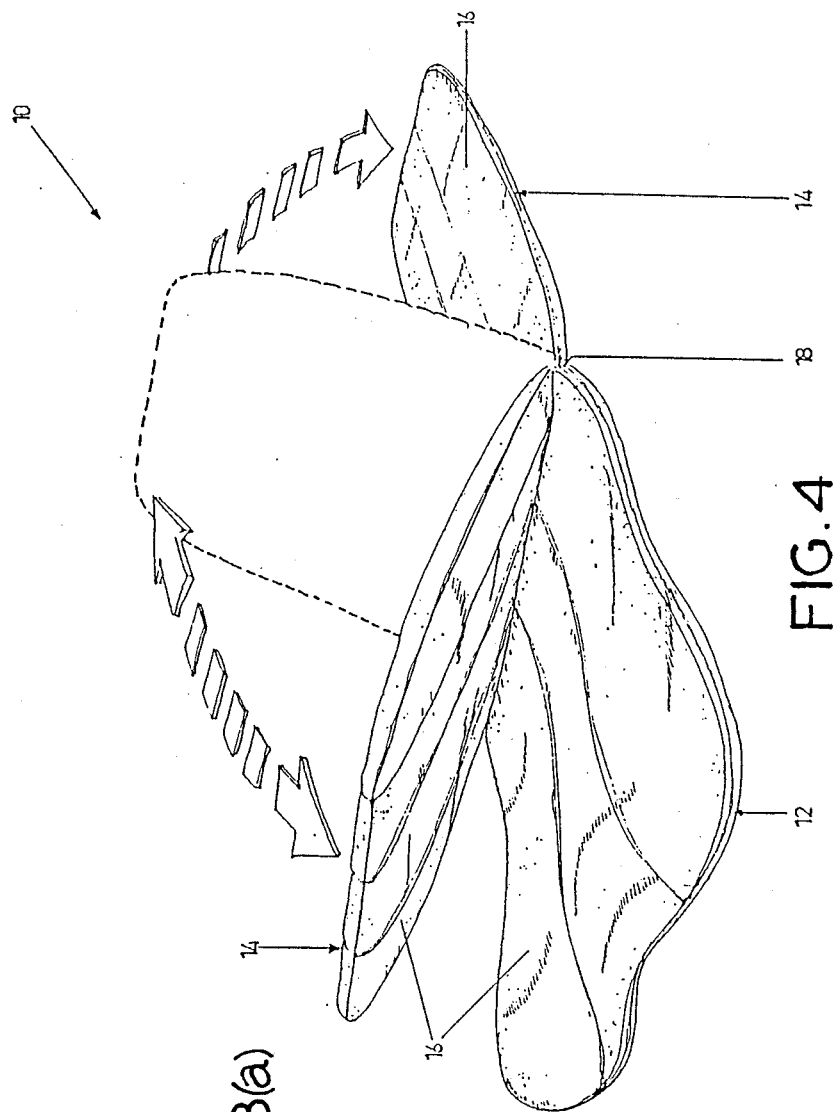
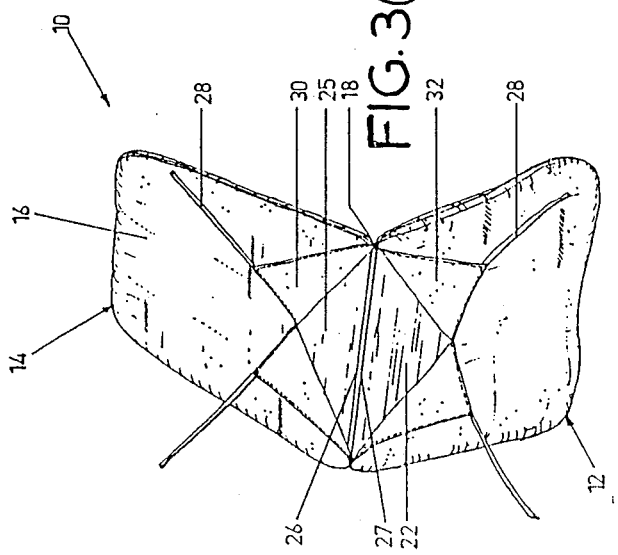
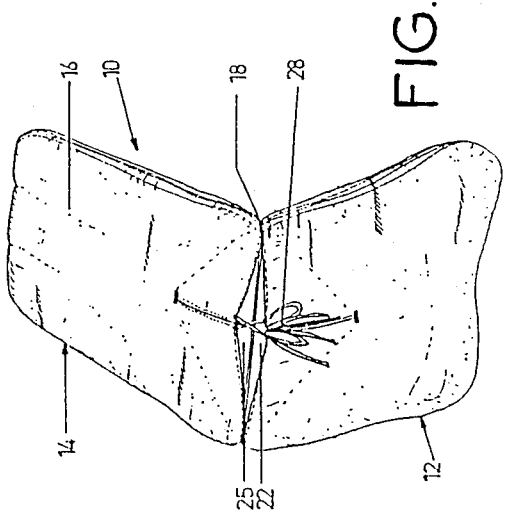
FIG. 4
FIG. 3(a)
FIG. 3(b)

ORTHOPEDIC SEAT AND BACKREST COMBINATION

FIELD OF THE INVENTION

The present invention relates to orthopedic devices, more particularly, to a novel orthopedic seat and backrest combination providing increased comfort by allowing for interplay between individual seat and backrest portions.

BACKGROUND OF THE INVENTION

There are known prior art constructions of orthopedic seat and backrest devices intended to improve seating posture and eliminate low back pain discomfort. Generally, these are characterized by seat and backrest portions which are rigidly connected together by a hinge or joint, whereat the innermost point of the seating space is defined. These devices are adapted for placement on the seat of a chair and against the back portion thereof, and because of their special contour, they provide a correction for poorly developed seating postures.

Examples of orthopedic seat design include those directed to the backrest portion along, as described in U.S. Pat. Nos. 4,601,514, to Meiller and 4,597,386 to Goldstein. Examples of designs featuring a hinged or jointed seat or backrest are described in U.S Pat. Nos. 4,696,516 to Yeum, 4,161,337 to Ross, et. al., 3,813,148 to Kraus and 3,778,104 to Kusters.

As stated previously, the intention of orthopedic seat design is to provide correct and comfortable seating posture and eliminate low back pain discomfort. The degree of comfort associated with each correct seating posture varies from individual to individual, and this is related to the variation in the musculo-skeletal characteristics of individuals. Thus, in the prior art orthopedic seat designs, in which a fixed relationship between the seat and backrest portions exists because of a rigidly hinged or jointed arrangement, the degree of comfort required for the correct seating posture of given individuals cannot be entirely matched across the range of variations.

Therefore, it would be desirable to provide an orthopedic seat and backrest combination which is adjustable in accordance with the comfort requirements associated with correct seating postures.

SUMMARY OF THE INVENTION

Accordingly, it is a principal object of the present invention to provide an orthopedic seat and backrest combination device which relieves pressure on the lower back and pelvis and provides a balanced distribution of weight on the behind and the legs in accordance with user seating posture.

In accordance with a preferred embodiment of the present invention there is provided an orthopedic seat and backrest combination device comprising:

a seat member formed of rigid material having a shaped contour providing recesses in a seating space defined above the surface thereof;

a back member formed of a rigid material having a shaped contour providing support for the lumbar lordosis region of the lower back; and a flexible member stretchably connecting said seat and back members proximate respective rear and lower edges thereof such that in a flat orientation wherein said seat and back members lie substantially in the same plane, said respective rear and lower edges are disposed opposite one another, said flexible member providing interplay between said back member lower edge and said seat member rear edge to allow for adjustable orientation of said seat and back members within said seating space, enabling said back member lower edge to be disposed either above or behind said seat member rear edge, in accordance with the desired seating comfort of the user.

In the preferred embodiment, the seat and backrest combination device of the present invention is formed of contoured, rigid panels which are retained within a slipcover formed of a specially shaped stretchable cloth material. The slipcover is shaped in a "saddlebag" design, having a pair of pockets each of which has a front and rear face, the front faces of the two pockets being jointed by a single strip extending for substantially the entire width of the slipcover. The slipcover thus provides the flexible member which allows for interplay between the seat panel rear edge and the back panel lower edge. By appropriate adjustment, the user is provided with a maximum degree of seating comfort, while the benefits of the orthopedic design are not sacrificed. For example, the back panel lower edge may be placed upon or behind the seat panel rear edge, and this is made possible by the stretchable fabric material used to construct the slipcover.

Also in the preferred embodiment, padding section materials such as foam are provided as cushions for the seat and back panels which are enclosed within the slipcover. Because of its novel design, the slipcover allows for a wide range of orientation adjustment between the seat and back panels, including a lie-down position in which the seat and back panels are in substantially flat orientation with respect to one another.

A feature of the invention is the provision of a set of adjusting strings attached at the open ends of the opposing pockets, and these can be tied together to establish the orientation between seat and back panels as desired by the user in accordance with seating comfort requirements.

The inventive seat and backrest combination device is designed to be portable, and is made of durable and lightweight materials which make is suitable for use in a wide variety of applications.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings in which like numerals designate corresponding elements or sections throughout, and in which:

FIGS. 2a–c show, respectively, a sectional side view and enlarged detailed views of portions of the orthopedic device of FIG. 1;

FIGS. 3a–b show, respectively, rear views of the orthopedic device of FIG. 1 in a folded orientation wherein a slipcover is shown in open and closed positions;

FIG. 4 shows the orthopedic device of FIG. 1 in various orientations by which the seating space can be adjusted.

DETAILED DESCRIPTION OF A PREFERRED EMBODIMENT

Figure 1:
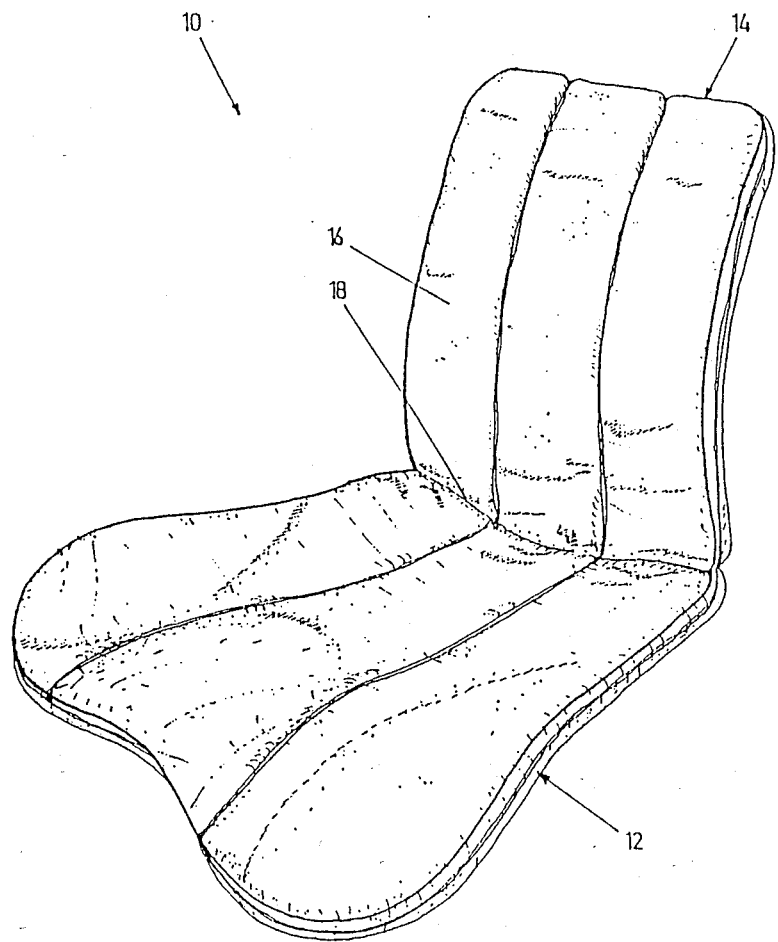
FIG. 1 is a perspective view of a preferred embodiment of an orthopedic seat and backrest combination device designed and constructed according to the principles of the present invention.

Referring now to FIG. 1, there is shown a perspective view of a preferred embodiment of an orthopedic seat and backrest combination device 10 constructed in accordance with the principles of the present invention. Orthopedic device 10 comprises seat and backrest portions 12 and 14 which are joined together by a slipcover 16 such that a flexible joint 18 is formed between them. Typically, orthopedic device 10 is placed within the seating space defined by a deskchair, armchair, car seat, etc. and flexible joint 18 is placed at the innermost point of the seating space. As further described herein, flexible joint 18 may be adjusted for maximum seating comfort of the user, without sacrificing the orthopedic benefits provided by the contour of seat and backrest portions 12 and 14.

The orthopedic design of seat and backrest portions 12 and 14 is such as to eliminate lower back pain discomfort by supporting the lumbar lordosis region of the lower back and preventing rotation of the pelvis, known to be the result of improper seating posture. Because of its novel design, flexible joint 18 permits interplay between seat and backrest portions 12 and 14 in accordance with the comfort requirements associated with correct seating posture.

Turning now to FIG. 2a, there is shown a side sectional view of orthopedic device 10, revealing an internal sandwich-like construction within upper and lower pockets (FIG. 3) of slipcover 16. Seat portion 12 comprises a seating pad 20 and rigid seat member 22, which are enclosed within slipcover 16. In like fashion, backrest portion 14 comprises backpad 24 and rigid back member 25.

Seat 20 and backpad 24 are typically manufactured of polyurethane foam and seat and back rigid members 22 and 25 are typically made of wood or molded plastic materials. For example, these may be manufactured of plastic acrylic, ABS plastic, polypropylene, or wood materials, each of which retains its shape under excesses of temperature. Slipcover 16 is typically manufactured of a stretchable fabric material, enabling flexible joint 18 to provide interplay between seat and backrest portions 12 and 14.

In FIG. 2b, the encircled portion of orthopedic device 10 construction (FIG. 2a) is enlarged to provide a detailed view. In this arrangement, a lower edge 26 of rigid back member 25 is disposed above a rear edge 27 of rigid seat member 22. As best shown in FIG. 3a, a rear opening in slipcover 16 enables pads 20, 24 and rigid member 22, 25 to be inserted therein. Adjusting strings 28 can then be used to close the rear opening in slipcover 16 by tying together a set of upper pocket flaps 30 and a set of lower pocket flaps 32.

As shown in FIG. 2c, the elements of orthopedic device 10 have been rearranged such that the rear edge 27 of seat member 22 abuts lower edge 26 of rigid back member 25. It is a particular feature of the present invention that adjusting strings 28 may be tied so as to allow interplay between these elements in flexible joint 18, to achieve maximum seating comfort. If these strings 28 are tied loosely, this adjustment may be made without the need to open and reclose upper and lower pocket flaps 30 and 32 each time the adjustment is made. Alternatively, if adjusting strings 28 are tied tightly together, this will limit the amount of interplay provided in flexible joint 18.

FIGS. 3a-b show, respectively, rear views of orthopedic device 10 with upper and lower pocket flaps 30 and 32 shown in open and closed positions. In the open position which may be used for assembly purposes, pads 20, 24 and rigid members 22, 25 may be inserted in slipcover 16 such that lower edge 26 of back member 25 is disposed proximate rear edge 27 of seat member 22. Once the desired adjustment of these edges 26, 27 is obtained, adjusting strings 28 are used to close upper and lower pocket flaps 30 and 32, and these may be tied with the desired degree of tightness, while allowing for interplay in flexible joint 18.

For aesthetic purposes, a cover strip (not shown) may be placed over flexible joint 18 at the rear opening in slipcover 16 and under pocket flaps 30 and 32, to hide edges 26, 27 and the edges of the seat and back pads 20 and 24 from view.

Turning now to FIG. 4, there is shown a perspective view of orthopedic device 10 in which backrest portion 14 is illustrated as being foldable with respect to seat portion 12, indicating the degree of adjustment possible in flexible joint 18 for achieving a desired orientation. Included in the possible orientations is a lie-down position in which seat and backrest portions 12 and 14 are disposed substantially in the same plane.

Figure 5B:
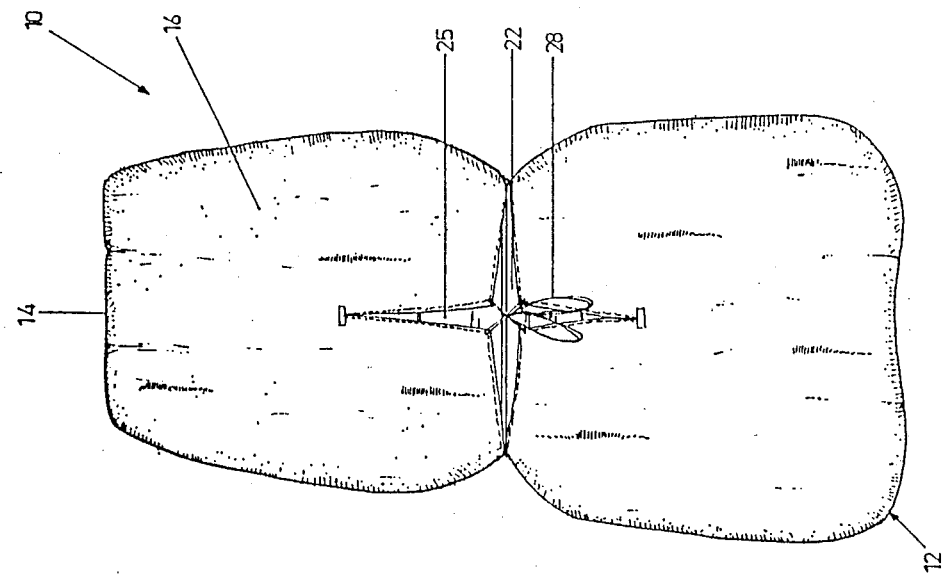
FIGS. 5a-b show, respectively, rear views of the orthopedic device of FIG. 1 in a flat orientation wherein the slipcover is stretched while open and then closed.
Figure 5A:
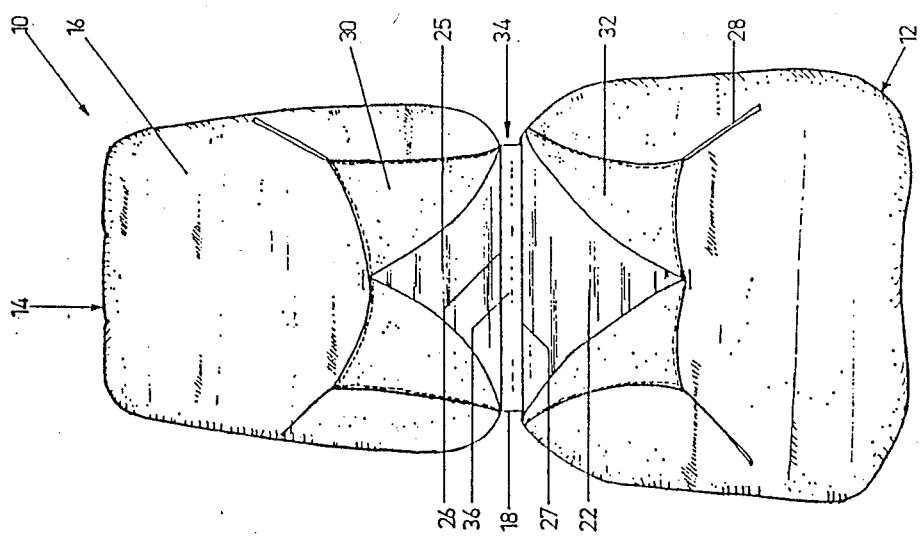

Turning now to FIGS. 5a-b, there are shown, respectively, rear views of orthopedic device 10 in a flat orientation with upper and lower pocket flaps 20 and 32 in open and closed positions. In FIG. 5a, the seat and backrest portions 12 and 14 are stretched apart at portion 34 of slipcover 16. This creates a space 36 between rear edge 27 of seat member 22 and lower edge 26 of back member 25. In FIG. 5b, adjusting strings 28 have been tied together and if this is done tightly, space 36 is nearly eliminated as rear edge 27 and lower edge 26 are drawn together opposite one another.

Stretched portion 34 of slipcover 16 illustrates the nature of flexible joint 18 in providing interplay between seat member 22 and back member 25. As shown, flexible joint 18 extends substantially along the dimension of edges 26 and 27.

It will be appreciated that flexible joint 18, while provided by slipcover 16 in the preferred embodiment, may be provided by an alternative construction which does not require use of slipcover 16. For example, seat and backrest portions 12 and 14 may be joined together by a strip of flexible material such as plastic or rubber, which is appropriately shaped for attachment substantially along edges 26 and 27, while allowing for interplay between them. The attachment may be effected by a slot formed in edges 26, 27 for flexible material insertion.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

I claim:

1. An orthopedic seat and backrest combination device comprising:
   a seat member formed of rigid material having a shaped contour providing recesses in a seating space defined above the surface thereof;
   a back member formed of a rigid material having a shaped contour providing support for the lumbar lordosis region of the lower back; and
   a flexible member stretchably connecting said seat and back members proximate respective rear and lower edges thereof such that in a flat orientation wherein said seat and back members lie substantially in the same plane, said respective rear and lower edges are disposed opposite one another,
   said flexible member providing interplay between said back member lower edge and said seat member rear edge to allow for adjustable orientation of said seat and back members within said seating space, enabling said back member lower edge to be disposed either above or behind said seat member rear edge, in accordance with the desired seating comfort of the user.

2. The device of claim 1 wherein said seat and back members are formed of a wood material.

3. The device of claim 1 wherein said seat and back members are formed of a plastic material.

4. The device of claim 1 wherein said flexible member comprises a strip of plastic material attached between and extending substantially along said back member lower edge and said seat member rear edge.

5. The device of claim 1 wherein said flexible member comprises a rubber material attached between and extending substantially along said back member lower edge and said seat member rear edge.

6. The device of claim 1 wherein said flexible member comprises a slipcover providing a pair of pockets each of which encloses a respective one of said seat and back members, a front face of said pockets being joined together to form a strip extending substantially along said back member lower edge and said seat member rear edge, such that in said flat orientation, the open ends of said pockets are disposed opposite one another.

7. The device of claim 6 wherein said slipcover is formed of a stretchable fabric material.

8. The device of claim 6 additionally comprising padding material enclosed within said pockets for providing a cushion between each of said seat and back members and the user.

9. The device of claim 8 wherein said padding material is formed of polyurethane foam.

10. The device of claim 9 for use as an orthopedic seat support in an armchair, easy chair, desk chair, car seat and the like.

* * * * *